(12) United States Patent
Corroy et al.

(10) Patent No.: US 8,866,760 B2
(45) Date of Patent: Oct. 21, 2014

(54) USER IDENTIFICATION BASED ON BODY-COUPLED COMMUNICATION

(75) Inventors: Steven Corroy, Eindhoven (NL); Karin Klabunde, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 263 days.

(21) Appl. No.: 13/132,699

(22) PCT Filed: Nov. 20, 2009

(86) PCT No.: PCT/IB2009/055227
§ 371 (c)(1),
(2), (4) Date: Jun. 3, 2011

(87) PCT Pub. No.: WO2010/064162
PCT Pub. Date: Jun. 10, 2010

(65) Prior Publication Data
US 2011/0227856 A1   Sep. 22, 2011

(30) Foreign Application Priority Data
Dec. 5, 2008  (EP) ..................................... 08305890

(51) Int. Cl.
*G06F 3/041*  (2006.01)

(52) U.S. Cl.
USPC ........................ 345/173; 340/5.8; 340/10.42

(58) Field of Classification Search
USPC ................................................. 345/173–175
See application file for complete search history.

(56) References Cited

U.S. PATENT DOCUMENTS

| | | | |
|---|---|---|---|
| 6,580,356 B1 * | 6/2003 | Alt et al. ......................... 340/5.8 |
| 2005/0253815 A1 * | 11/2005 | Blacklock et al. ............ 345/169 |
| 2008/0046039 A1 | 2/2008 | Corndorf |
| 2008/0046753 A1 | 2/2008 | Fusari |
| 2008/0109895 A1 | 5/2008 | Janevski |
| 2008/0294722 A1 | 11/2008 | Park |

FOREIGN PATENT DOCUMENTS

| | | |
|---|---|---|
| EP | 1096722 A2 | 5/2001 |
| EP | 1187375 A1 | 3/2002 |
| EP | 0824799 B1 | 8/2002 |
| EP | 1187375 B1 | 3/2004 |
| WO | WO2007129237 A1 | 11/2007 |

* cited by examiner

*Primary Examiner* — Robin Mishler
(74) *Attorney, Agent, or Firm* — Larry Liberchuk

(57) ABSTRACT

A secure identification system is proposed in which a user gets access through an identification device or badge or tag (51) worn on his/her body, which applies the techniques of body coupled communication (BCC) to create a kind of aura around the user. An identification (ID) is communicated to a user interface of the secure identification system through BCC communication, and the user is authenticated by the system through an authentication procedure checking the identity of the user on the basis of an assumed secure BCC communication of the ID.

14 Claims, 6 Drawing Sheets

USER IDENTIFICATION BASED ON BODY-COUPLED COMMUNICATION

FIELD OF THE INVENTION

The present invention relates to an identification device, method, system and computer program product for identifying a user based on body-coupled communication signals.

BACKGROUND OF THE INVENTION

Body coupled communications (BCC) or body-based communication has been proposed as a promising alternative to radio frequency (RF) communication as a basis for body area networks. BCC allows exchange of information between a plurality of devices which are at or in close proximity of a body of a human or an animal. This can be achieved by capacitive or galvanic coupling of low-energy electrical fields onto the body surface. Signals are conveyed over the body instead of through the air. As such, the communication is confined to an area close to the body in contrast to RF communications, where a much larger area is covered. Therefore, communication is possible between devices situated on, connected to, or placed close to the body. Moreover, since lower frequencies can be applied than typically applied in RF-based low range communications, it opens the door to low-cost and low-power implementations of body area networks (BANs) or personal area networks (PANs). Hence, the human body is exploited as a communication channel, so that communication can take place with much lower power consumption than in standard radio systems commonly used for BANs (e.g. ZigBee or Bluetooth systems). Since BCC is usually applied in close proximity to the body, it can be used to realize new and intuitive body-device interfaces based on contact or proximity. This creates possibilities for many applications in the field of identification and security.

FIG. 1 shows a schematic diagram indicating involvement of a human body in a BCC communication system. Small-sized BCC devices without direct skin contact can be realized by exploiting capacitive coupling to the human body. A two-electrode TX device generates a variable electric field that is coupled to the human body; a two-electrode RX device senses the variable electric potential of the human body with respect to the environment. Measurements have shown that a typical body channel has a high-pass character, with a lower corner frequency determined by the input impedance of the RX device and by the capacitance of the electrodes. The signal attenuation is less than 80 dB for devices positioned at various distances on the static or moving human body. With respect to interferences, the body picks-up a significant amount of interferences in the frequency band below 1 MHz, while for higher frequencies the level of interference stays below 70 dBm and their frequency spectrum is to a great extent dependent on the environment. Hence, the established body-channel properties make the frequency band between 1-30 MHz especially attractive for BCC as this band can provide sufficient data-rate for healthcare or consumer applications (up to 10 Mb/s) and the impact of radio frequency (RF) interference is less, as the body does not act as an efficient antenna.

BCC can be technically realized by electric fields that are generated by a small body-worn tag, e.g., being integrated into a credit card or another suitable device attached to or worn in close proximity to the body. This tag capacitively or galvanicly couples a low-power signal to the body. Sometimes this body-coupled communication is referred to as "near-field intra-body communication". BCC is a wireless technology that allows electronic devices on and near the human body to exchange digital information through capacitive or galvanic coupling via the human body itself. Information is transmitted by modulating electric fields and either capacitively or galvanicly coupling tiny currents onto the body. The body conducts the tiny signal to body mounted receivers. The environment (the air and/or earth ground) provides a return path for the transmitted signal.

FIG. 2 shows a schematic block diagram of components involved in a BCC communication system, as disclosed for example in the European Patent EP0824799B1. The wireless system comprises a transmitter TX and a receiver RX each may have two conductive plates (an inner electrode arranged close to or on the body B, and an outer electrode) used for propagating the electric field and thus form an electric circuit composed by the body B and by a return path (air and ground GND). Information I supplied to the transmitter TX is encoded in an encoder COD and then amplified in an transmission amplifier $A_{TX}$. The BCC signal then propagates along a biological conductor formed by the body B to the receiver RX, where it is amplified by a receiving amplifier $A_{RX}$ and then decoded in a decoder DEC to obtain the transmitted information I. Thus, the transmitter TX and the receiver RX are coupled through the body B of a user and room or earth ground GND. The transmitter TX produces low-frequency, low power signals that, through capacitive coupling, pass as displacement currents into and from the body B of the user. The shared ground GND provides the return path for the current. The inner electrode may be closely coupled capacitively to the user's body B such that the "quasi-electrostatic" field resulting from the electrode potential causes a displacement current to pass to the user's body B. The outer electrode may be oriented so that its coupling to the room ground GND is stronger than that of the inner electrode, such that room ground GND acts as a return path for the current from the receiver RX. The receiver RX similarly comprises a pair of electrodes. One of the receiver electrodes is closely coupled capacitively to the user's body B such that displacement current that passes from the body B can be detected at that electrode. The signal then flows through a detector circuitry to the other electrode, which may be asymmetrically coupled capacitively to room ground GND, to complete the path for the current. The detector circuitry detects the current and operates in a conventional manner to recover the transmitted information therefrom. One or more receivers may be carried by other users or may be located in fixed positions around a room, and the return path can be a combination of air and earth ground. Accordingly, the user need not physically contact the receivers to pass information to them. Such a system may operate for example at 330 kHz and may be capable to achieve a data rate of a few kbps.

In hospitals for example, clinicians who are controlling medical imagery systems like e.g. X-Ray may be required to log-on before they use a computer and log-off afterwards. Indeed the medical data contained in the system must be very well protected and it must be ensured that no unauthorized person accesses this information. Therefore, authentication plays an important role. Current log-in procedures, for example using passwords, or fingerprints or other biometrics are very cumbersome, so that system access is slow and availability reduced.

To circumvent these time-consuming procedures, in practice, it happens often that a clinician logs-on once in the morning and logs-off once in the evening which potentially enables anyone to use the system during the day. This of course undermines the complete security of the system and is not at all acceptable.

SUMMARY OF THE INVENTION

An object of the present invention is to provide a reliable user identification with fast system access.

Accordingly, when a person touches the identification apparatus or system, at the moment he/she enters in contact with it or closely approaches it, the BCC transmitter oder transceiver of the portable apparatus (e.g. a badge or tag) transmits the user identification (ID) via the generated BCC channel to the BCC receiver or transceiver of the user interface at the identification apparatus or system. The received ID can be compared to those stored in a security database and if the person is authorized to use the system, he can be automatically and quickly logged-on without intentionally entering any password.

No matter where the person touches the user interface (e.g. screen or the like), it is possible to read the identifier of the person. With the proposed system, it is possible to identify and thus distinguish between users successively accessing the system. With each touch of the user interface, the identity of the user can be established. Moreover, it is possible to identify and thus distinguish between users successively accessing the system. The secure system thus provides secure, easy and quick access to it.

As an additional advantage, not only a person can be logged into the IdSystem but also his action. This means that each touch can be identified and logged. Therefore multiple persons accessing the system at the same time could have different privileges. Moreover, due to the BCC based communication, the user does not have to move his tag or badge towards the IdSystem. With BCC he/she can keep everything as it is and just needs to touch the screen or respective other input device.

The proposed apparatuses of the identification system may be implemented as chip module, chip set or circuit board provided for example in a transceiver arrangement or device and may comprise a (de-)coder for (de-)coding a BCC transmission signal. More specifically, the portable apparatus may be comprised in a terminal device or another device wearable by said user. It may be integrated for example into a cloth wearable by said user.

According to a first aspect, the signal detected by the portable apparatus may be a received BCC communication signal. This provides the advantage that communication in both directions is achieved by BCC signals via the BCC transmission channel established by touching or approaching the other communication end (e.g. identification apparatus).

According to a second aspect which may be combined with the first aspect, the portable apparatus may comprise an authenticator for authenticating the user. Thereby, identification or authentication of a user is possible at the portable apparatus (e.g. BCC user tag or badge) by the input device. Then as long as the tag stays on or close to the user's body, the authentication is valid and the user can be identified correctly in the system.

According to a third aspect which may be combined with any one of the first and second aspects, the authenticator may be adapted to authenticate the user based on an input signal received from an input device such as a user interface for example a keyboard or a biometric sensor, to activate the portable apparatus in response to the result of the authentication. When the user wants to activate his tag or badge he can, for example, enter a password or a biometric pattern to authenticate himself. System reliability can thus be enhanced.

According to a fourth aspect which may be combined with any one of the first to third aspects, the authenticator may be adapted to deactivate the portable apparatus in response to at least one of a measured power or interference level of at least one body coupled communication channel and a detected temperature change. Hence, if the portable apparatus detects that it is no more on or close to a user's body, it can be automatically deactivated and a new password authentication may be required.

According to a fifth aspect which may be combined with any one of the first to fourth aspects, the authenticator may be adapted to create a list of available body communication transceivers based on received responses to an initial discovery message, to control the transmitter of the portable apparatus to transmit a presence detection message over the body of said user at predetermined intervals, and to deactivate the portable apparatus if no responses are received from a predetermined number of transceivers for a predetermined number of times.

According to a sixth aspect which may be combined with any one of the first to fifth aspects, the identification apparatus may comprise a touch screen comprising the sensor. This provides the advantage that the user can initiate the identification or authentication by simply using the touch screen without any additional authentication operation or action. The BCC signal transfer is automatically started when the sensor is activated.

According to a seventh aspect which may be combined with any one of the first to sixth aspects, the user action may comprise a touching operation. Thus, a normal touching operation as such initiates user identification or authentication.

According to an eighth aspect which may be combined with any one of the first to seventh aspects, detection electrodes of the receiver may be integrated in the touch screen. This is advantageous in that the touch screen itself also provides for the capacitive coupling of the BCC signal from/to the body of the user. The BCC receiver can thus be hidden in the touch screen and the user does not need to touch or approach any other device to enable signal transfer.

According to a ninth aspect which may be combined with any one of the first to eighth aspects, the identification apparatus may comprise a security database for storing the stored information. Thereby, authentication information or user identifications of a plurality of users can be stored at the identification apparatus to enable secure use of the identification apparatus by a plurality of users.

According to a tenth aspect which may be combined with any one of the first to ninth aspects, the access controller of the identification apparatus may be adapted to automatically log-on the user if the user is authorized to use the identification apparatus. This allows fast system access without any additional user initiation of the log-on procedure.

According to an eleventh aspect which may be combined with any one of the first to tenth aspects, the access controller of the identification apparatus may be adapted to automatically log-off the user after a timer has counted a predetermined time-out since the last user action. This measure leads to an enhanced system reliability due to the fact that non-authorized use of or access to the system during absence of an authenticated user can be prevented.

According to a twelfth aspect which may be combined with any one of the first to eleventh aspects, the access controller of the identification apparatus may be adapted to store an information indicating an identification and an access time of each user having accessed the identification apparatus. Thereby, a detailed access history can be retrieved for various purposes.

According to a thirteenth aspect which may be combined with any one of the first to twelfth aspects, an authentication device may be provided at the identification apparatus, for inputting a user-specific information, wherein the access controller may be adapted to check the input user-specific information and to control a transmitter for body coupled communication to transmit a confirmation message if the input user-specific information is correct. This provides the advantage that access to the portable apparatus can be authenticated at the identification apparatus. In response to the confirmation message, the portable apparatus can then be activated or deactivated.

It is noted that, the portable apparatus and the identification apparatus may be a receiver, transmitter or transceiver for BCC signals and may be implemented as a discrete hardware circuitry with discrete hardware components, as a integrated chip, as an arrangement of chip modules, or as a signal processing device or chip controlled by a software routine or program stored in a memory.

BRIEF DESCRIPTION OF THE DRAWINGS

The invention will now be described, by way of example, based on embodiments with reference to the accompanying drawings, wherein.

DESCRIPTION OF PREFERRED EMBODIMENTS

Various embodiments of the present invention will now be described based on a BCC system. As already mentioned above, BCC signals are conveyed over the body instead of through the air. As such, the communication is confined to an area close to body, in contrast to radio frequency (RF) communications, where a much larger area is covered. Therefore, TX and RX devices are situated on, connected to, or placed close to the body. This creates possibilities for many applications in the field of identification and security. Moreover, since lower frequencies can be applied than in RF communications, it opens the door to low-cost and low-power implementations. Data signals are not transmitted by antennas but using "couplers", consisting of e.g. electrodes. These couplers are configured to couple, e.g. galvanic or capacitive, the data signals to the body.

Figure 1:
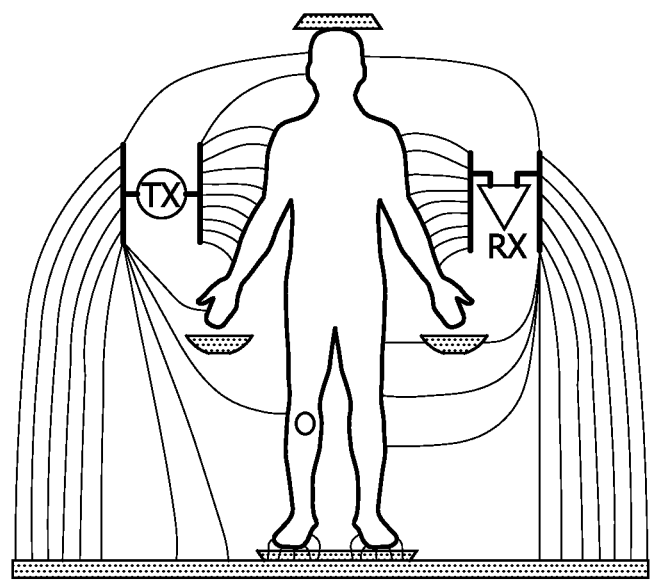
FIG. 1 shows a schematic human body and its involvement in a BCC system.
Figure 2:
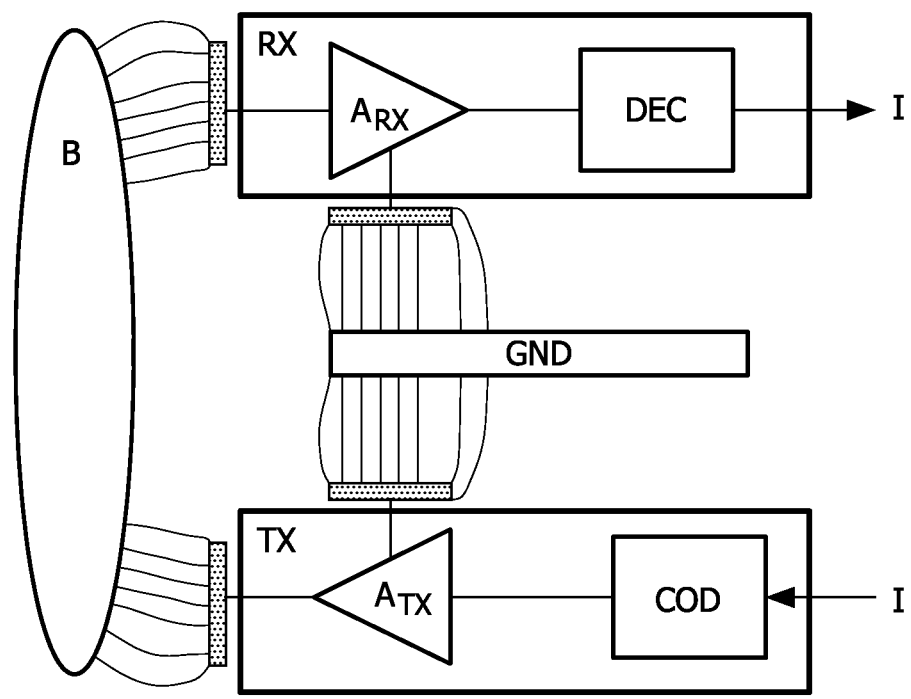
FIG. 2 shows a schematic block diagram of a BCC system.
Figure 3:
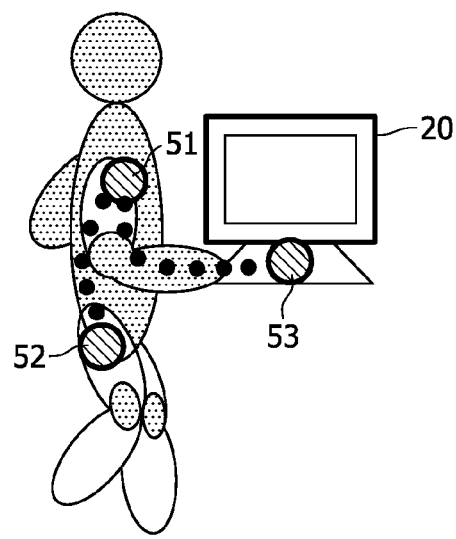
FIG. 3 shows a schematic overview of a BCC-based identification system according to various embodiments.

FIG. 3 shows a schematic overview of a basic structure of a BCC based identification and/or authentication system according to various embodiments. In the examples of the following embodiments, a secure touch screen is enabled by a BCC system. The proposed overall system comprises a touch screen device 20 as an example of an identification device or system, in the following sometimes referred to as "IdSystem", where a user can be identified. The touch screen device 20 comprises a BCC transceiver 53 and a database, not shown, for storing identification and/or authorization information of authorized users.

Additionally, a BCC identification badge of tag 51, in the following sometimes referred to as "IdTag", is worn by the user and comprises a BCC transceiver. Optionally, the user may wear one or more authentication badges or tags 52 with additional BCC transceivers for authentication purpose (in the following sometimes referred to as "AuthTags").

The IdSystem-side BCC transceiver 53 can be attached to, included in, or integrated into the touch screen device 20. Coupling electrode plates of the BCC transceiver 53 can be integrated for example in the touch screen itself or they may be part of the shelf or part of the screen. The BCC transceivers provided in the IdTag 51 or the AuthTag 52 worn by the user can be integrated in the respective badge or tag which may be implemented as a watch or any kind of jewelry or in a consumer electronics device, e.g. mobile phone, PDA or the like.

When a person, e.g. a clinician at a hospital, touches the screen of touch screen device 20, at the moment his finger enters in contact with it or approach it, the BCC transceiver of the IdTag 51 transmits a unique identification or identifier (ID) to the BCC transceiver 53 of the screen. This ID is compared to those stored in the security database and if the person is authorized to use the system, he is automatically logged-on without intentionally entering any password. No matter where the person touches the screen, it is thus possible to read the ID of the person.

If no further touches appear, the user could be automatically logged-off after a certain time-out. It could also be possible to determine for each single touch who is touching the screen and to check whether the user is allowed to perform the action.

Figure 4:
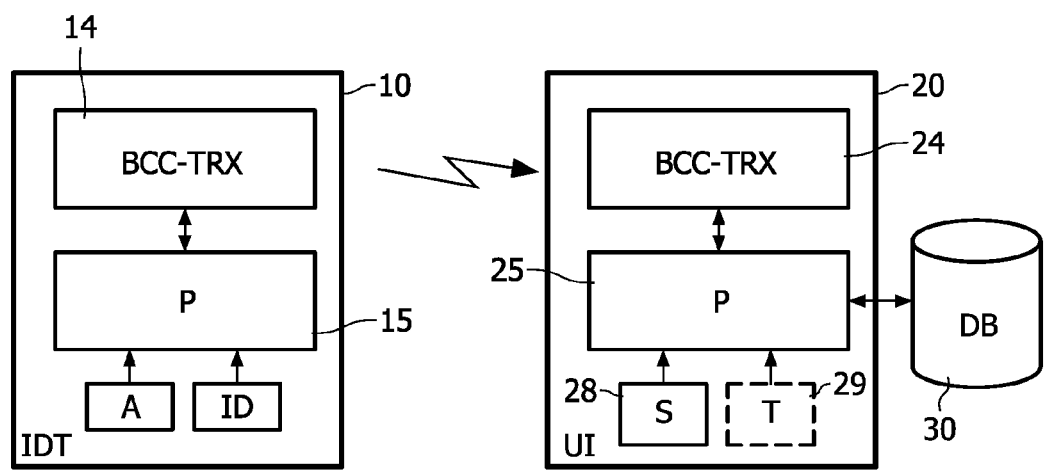
FIG. 4 shows a schematic block diagram of a BCC-based identification system according to a first embodiment.

FIG. 4 shows a schematic block diagram of an identification system according to a first embodiment. The identification system comprises IdTag (IDT) 10 and a user interface (UI) 20, such as a touch screen device. The IdTag 10 comprises a BCC transceiver (BCC-TRX) 14 for transmitting and receiving BCC signals via coupling electrodes (not shown) over a BCC channel formed by the body of a user who wears the IdTag 10. Additionally, a processing device or processor (P) 15 is provided in the IdTag 10, which is coupled to the BCC transceiver 14 and which has access to a user ID and an authentication information (A), e.g., username and password.

The user interface (UI) 20 also comprises a BCC transceiver (BCC-TRX) 24 for transmitting and receiving BCC signals via coupling electrodes (not shown) over a BCC channel formed by the body of a user who touches or at least approaches the user interface 20. Additionally, a processing device or processor (P) 25 is provided in the user interface 20, which is coupled to the BCC transceiver 24 and which has access to at least one sensor (S) 28 and an optional timer (T) 29.

In the touch-screen implementation of the first embodiment, the touch screen of the user interface 20 may be switched on by default and a main menu can be displayed to any user. When a user now touches the screen, e.g. in order to choose a specific item on the screen, a BCC communication channel is provided and the two BCC transceivers 14, 24 can communicate with each other. The IdTag 10 sends the ID of the user via the BCC channel and the user interface 20 forwards the ID to the identification system, e.g. the processor 25 or a separate personal computer (PC) linked to the user interface 20. Then, the identification system checks in a database (DB) 30 if the ID of the user is authorized, i.e. if his/her ID is stored in the database 30. If the ID is authorized, the user can directly access his chosen item, data or application. The user does not need to intentionally initiate a log-on procedure, so that system access is fast and easy to use.

Otherwise, if the ID is not authorized, the user interface 20 does not provide access to the chosen item and may print an error message. From now on the identification system may identify the user at each touch and store an access history in the database 30. The access history may indicate what a user does with the system and/or who has used the system at which time.

If someone else touches the screen of the user interface 20, he/she may be brought back to the main menu or if two or more persons use the screen at the same time and are both/all authorized to use it, the system may enable them to process or control a common procedure or parallel procedures, thus not to be brought back to the main menu but to access the system together.

According to a modification of the first embodiment, the IdSystem 20 can be switched off and needs to be touched to be switched on. When a user touches the screen, he is logged in (if authorized). Then, at each touch, the optional timer 29 is started and restarted. When the timer 29 has elapsed, the user is logged out. Again, it is possible to track what a user does and when he does it.

User authentication is a major issue when using BCC for unobtrusive identification. The user can wear a BCC tag or badge or a portable device with such a BCC tag oder badge anywhere on his body and touches a BCC transceiver so as to be identified.

There are lots of cases or opportunities where an intruder can use the identity of an authorized user to get access to the system—although not authorized. For example, if a user looses or forgets his IdTag and an intruder finds it, or if an intruder steals the IdTag of a user.

Therefore, in the following embodiments, a tag authentication functionality or system, using an input device, such as a keyboard, biometric sensor or the like, is proposed to be combined with the BCC user tag (i.e. IdTag). When a user wants to activate his IdTag he must enter a password or a biometric pattern or signal or the like to authenticate himself. Identification of the user can then be assumed valid, as long as the IdTag stays on his body and the user has been identified correctly in the IdSystem. This enhancement considerably increases the security level of BCC-based identification systems.

If the IdTag detects that it is no more on the user's body, it can be automatically deactivated or disabled and a new password authentication could be required. Identification of user presence at the IdTag can be achieved for example by measuring channel interferences. Here, usage is made of the fact that channel interference is much higher when the IdTag is located on or near a human or animal body than away from such a body.

As an alternative, user presence at the IdTag could be identified based on a contact to another BCC node used for authentication. In that case the user wears at least two BCC transceivers. These two transceivers constantly check if they can communicate. If the communication link is broken, the tag knows that it is off-body, i.e. that a user is not present.

As a further alternative, user presence at the IdTag could be identified based on temperature detection. Here, a temperature sensor may be added that checks the temperature at the beginning of an operation, e.g., after the user has been authorized at the IdTag or after the IdTag has been switched on. Here, the IdTag could be deactivated when considerable temperature changes is detected based on the output of the temperature sensor.

Figure 5:
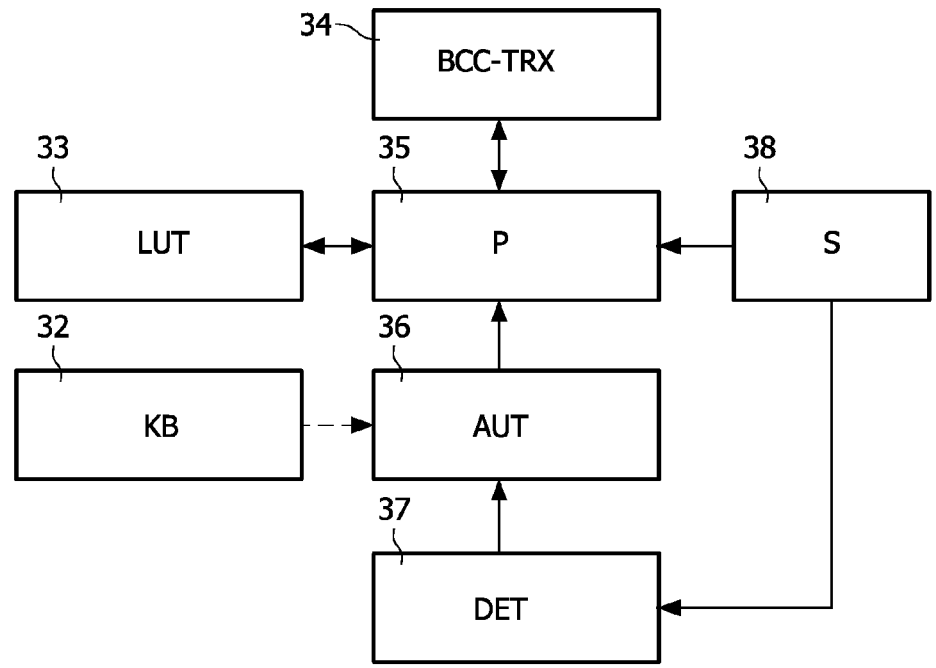
FIG. 5 shows a schematic block diagram of portable BCC device for a BCC-based identification system according to a second embodiment.

FIG. 5 shows a schematic block diagram of an IdTag with authentication option according to a second embodiment. The IdTag 10 comprises a BCC transceiver (BCC-TRX) 34 for transmitting and receiving BCC signals via coupling electrodes (not shown) over a BCC channel formed by the body of a user who wears the IdTag. Additionally, a processing device or processor (P) 35 is provided in the IdTag, which is coupled to the BCC transceiver 34. The processor 35 has access to a look-up table (LUT) 33 which stores user data which identifies users authorized to use the IdTag. The look-up table may be provided in any kind of detachable or non-detachable memory device. Furthermore, an authenticator (AUT) 36 is provided which receives user authentication information e.g. from an optional keyboard 32 or any other kind of input device, e.g. biometric sensor or the like, for inputting user authentication information. The authenticator 36 controls the processor 35 to activate/enable or deactivate/disable the IdTag in response to the authentication result. To achieve this, the authenticator accesses the look-up table 33 directly or via the processor 35 and compares an authentication input received e.g. from the keyboard 32 with a corresponding user data read from the look-up table 33 and activates/enables or deactivates/disables the IdTag in response to the comparison result.

Furthermore, at least one sensor (S) 38 is provided at the IdTag and the output(s) of the sensor(s) is/are supplied to a detector (DET) 37 which controls the authenticator 38 or directly the processor 35 to deactivate/disable the IdTag in response to a comparison of the sensor output(s) with (a) predetermined threshold(s).

Figure 6:
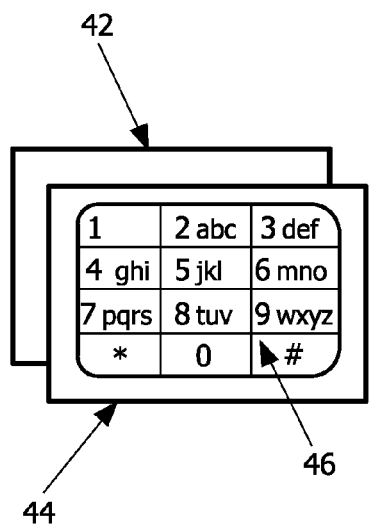
FIG. 6 shows a schematic diagram of a touch screen based identification device according to the second embodiment.

FIG. 6 shows a schematic diagram of an implementation example of the second embodiment where a small keyboard 46 is provided as authentication input device. The identity of an authorized user, e.g. user name and user password, can be stored in the look-up table 33. Additionally, an authentication password may be stored in the look-up table 33 or somewhere else in the IdTag, which can be entered via the keyboard for activation of the authentication function at the authenticator 36. The keyboard 46 is configured as a touch screen keyboard arranged on a front electrode plate 44 of the BCC transceiver 34. Additionally, the BCC transceiver 34 may have a back electrode plate 42 to enable capacitive coupling of BCC signals to the body of a user.

Figure 7:
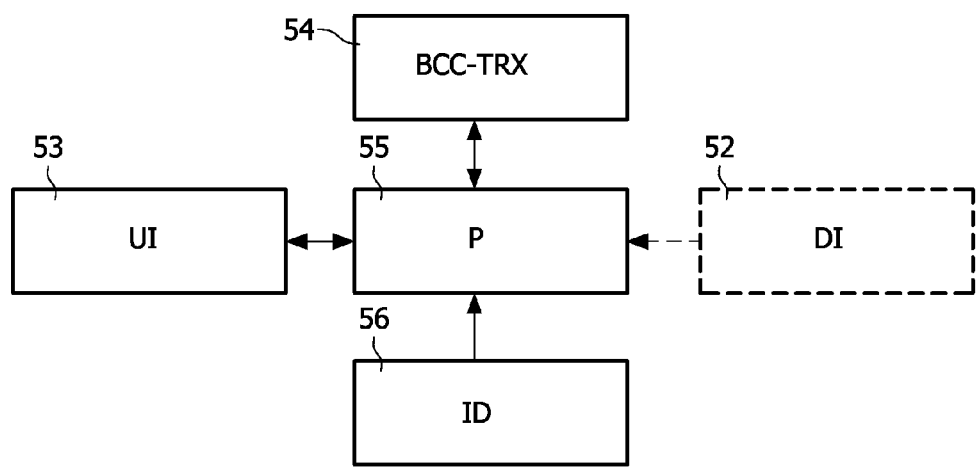
FIG. 7 shows a schematic block diagram of an identification device according to the second embodiment.

FIG. 7 shows a schematic block diagram of an IdSystem according to the second embodiment. The IdSystem comprises a BCC transceiver (BCC-TRX) 54 for transmitting and receiving BCC signals via coupling electrodes (not shown) over a BCC channel formed by the body of a user who touches or at least approaches the IdSystem. Additionally, a processing device or processor (P) 55 is provided, which is coupled to the BCC transceiver 54 and which has access to at least one user interface (UI) 53, e.g. a touch screen, and a user identification table (ID) 56 arranged as a detachable or non-detachable memory. Additionally, an optional data input device (DI) 52 (e.g. a keyboard or biometric sensor or the like) may be provided for entering user authentication data.

In the following, the operation of and interaction between the IdTag of FIGS. 5 and 6 and the IdSystem of FIG. 7 is described in more detail.

By default, the user's IdTag is disabled. When disabled, if the user touches the user interface 53 of the IdSystem, then the IdTag will not communicate with the IdSystem. Now, the user can activate the IdTag by authenticating himself. To achieve this, the user must enter an authentication information via the authentication input device, e.g., a password via the keyboard 32. The user can put the IdTag anywhere on his body (including in a wallet, bag, coat etc.). The IdSystem regularly or continuously transmits a request to log-in via its BCC transceiver 54. If the user has touched the user interface 53 of the IdSystem, then the IdTag can receive the request to log-in via the generated BCC channel and the IdSystem waits for the receipt of a user identification or identity which can be transmitted back via the generated BCC channel. If the received user identity matches an identity stored in the user identification table 56, a successful log-in is determined and the user is authorized in the IdSystem and can access the IdSystem.

Additionally, the IdTag can regularly measure the power level on the BCC channel, e.g. via the sensor 38 or directly via the BCC transceiver 34. If the power level is higher than a threshold Pth then the IdTag considers that it is still on the body of the user, it stays active and the authentication stays valid. If the power level is smaller than the threshold Pth, this is detected by the detector 37 based on the sensor output or the output of the BCC transceiver 34 and the IdTag considers that it is no more arranged on the body of the user. Hence, the detector 37 initiates a deactivation/disablement of the IdTag. Thus, the authentication is invalidated. If the user wants to activate the IdTag again, he/she has to enter the password or other authentication information again.

The above measurement or detection of the power level of the BCC channel for detecting if the IdTag is on or off the body is motivated by the observation that a BCC transceiver which is not on or close to a body does not couple to the body and receives few interferences on the channel. However, when the BCC transceiver is on or close to a body, it couples to it and the body acts as an antenna. Therefore, a lot of interferences can be received on the established BCC channel, which are then sensed by the BCC transceiver. It is therefore possible to set a threshold beyond which it can be decided that a BCC transceiver is coupled to a body As an additional or alternative option according to a third embodiment, a user can wear one or more, i.e. between 1 and t, additional authentication tags (AuthTags) on his body to ensure that the IdTag is still on the body.

Figure 8:
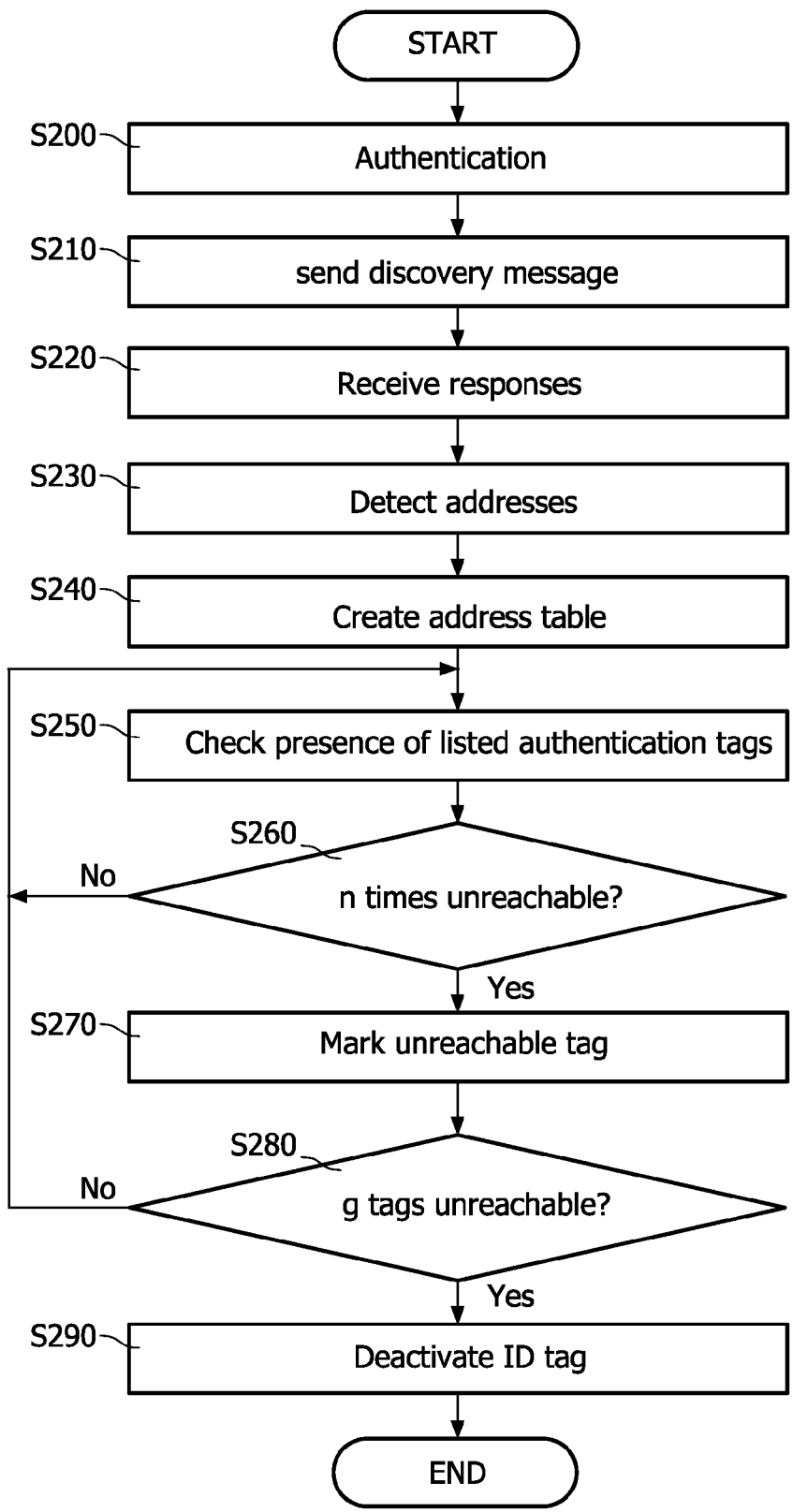
FIG. 8 shows a flow diagram of an user presence identification procedure according to a third embodiment.

FIG. 8 shows a flow diagram of a user presence identification procedure according to the third embodiment.

In step S200 user authentication is performed. After the user has entered the authentication password and authentication was successful, the BCC transceiver of the IdTag sends a discovery message via the BCC channel on the body of the user (step S210). All AuthTags on the body respond with a message containing their address. These responses are received in step S220. In step S230 the IdTag detects the addresses in the received responses. Then, in step S240, the IdTag creates a table containing all these addresses. This address table may be stored for example in the look-up table 33 of the IdTag shown in FIG. 5.

The IdTag (e.g. under control of the detector 37 of FIG. 5) checks regularly the presence of all the AuthTags on the body by sending a "presence detection" message (step S250). When an AuthTag receives this presence detection message, it replies with its address. If the IdTag detects in step S260 that an AuthTag is n times absent of the body (i.e. an AuthTag does not respond n times) then the IdTag considers the concerned AuthTag as unreachable and no longer part of the body. Accordingly, such unreachable AuthTag(s) is/are marked in step S270 e.g. by setting a corresponding flag or information in the address table. Then, it is checked in step S280 whether g AuthTags have been marked as unreachable. If it is determined in step S260 that no AuthTag has been unreachable n times or if it is determined in step S280 that less than g AuthTags are marked as unreachable, the checking procedure jumps back to step S250 and continues there. If the IdTag determines in step S280 that g tags (g between 1 and t) are unreachable, then it considers that it is off-body and deactivates itself. If the user now wants to re-activate the IdTag, it has to enter the password again. It is noted that t, n and g can be configured as parameters of the system and can be set by the system administrator.

The required two (or more) BCC tags can still be worn anywhere on the body and the identification can still be performed without additional user interaction by only "using" the IdSystem, not decreasing the unobtrusive feature of BCC identification. 50% of the working people wear a uniform or work clothes which enables to embed the AuthTags in those specific clothes and thus requiring the user to wear only one tag (i.e. the IdTag)

In the following, a fourth embodiment is described, where user authentication at the Idtag is enabled without requiring a keyboard or other authentication input device at the IdTag. Instead of the IdTag, the IdSystem (e.g. door, pc, . . . ) contains the authentication input device.

Figure 9:
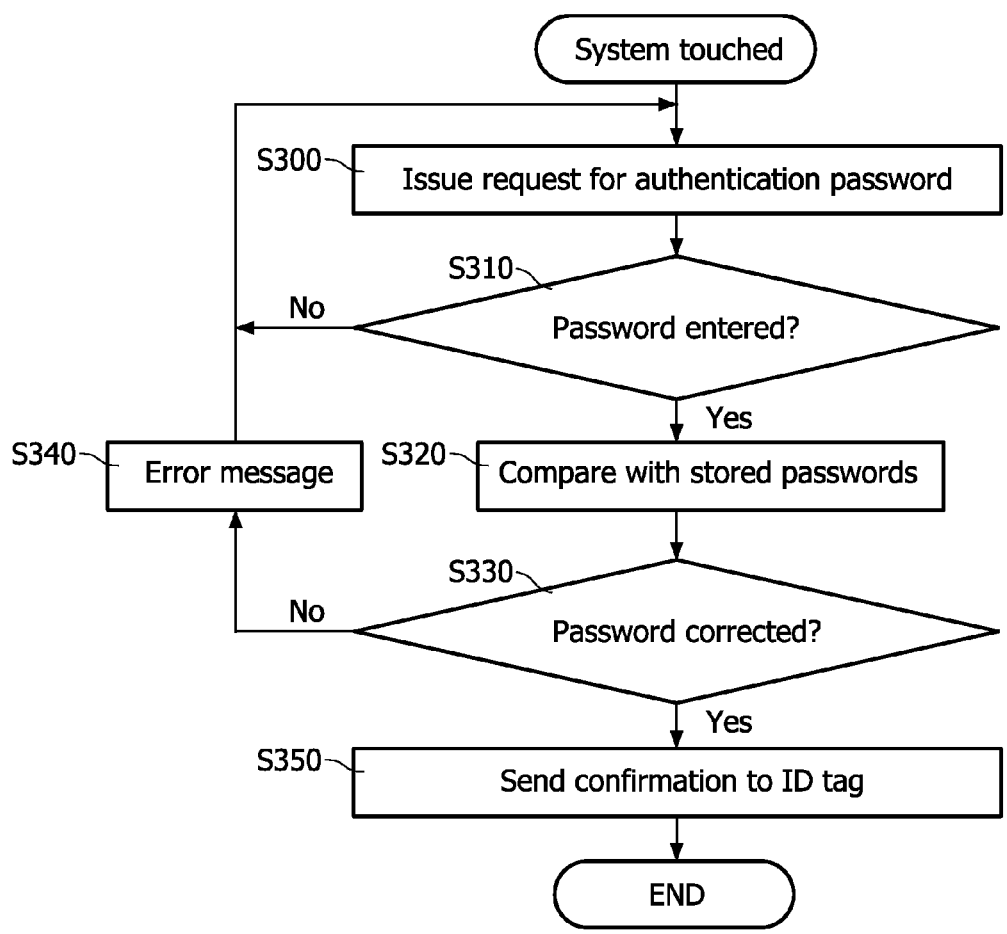
FIG. 9 shows a flow diagram of an identification procedure according to a fourth embodiment.

FIG. 9 shows a flow diagram of user presence identification procedure according to the fourth embodiment.

The procedure is initiated when a user touches the IdSystem. Then he/she is requested in step S300 to enter an authentication password. In that case the IdSystem has also a database containing information for associating available BCC tags to their associated authentication password. In step S310 it is checked whether a password has been entered. If not, the procedure jumps back to step S300 and continues issuing the request for entering the authentication password. If it is determined in the step S310 that an authentication password has been entered by a user, the password is compared to the stored authentication passwords (step S320). Then, it is checked in step S330 whether the entered password was correct. If not, an error message is issued in step S340 and the procedure jumps back to step S300. If the entered password was correct, the IdSystem sends in step S350 a confirmation message to the IdTag which activates itself.

As already mentioned above, the authentication not necessarily needs to be a password authentication using a keyboard. Other authentication information based on biometric information such as fingerprint, face recognition, eye recognition or the like may be used.

It is further noted that the steps of FIGS. 8 and 9 can be implemented as a program or software routine which controls a processor device, e.g. a central processing unit of a computing device, such as the processors of FIGS. 4, 5 and 7, provided in the IdTag or the IdSystem.

This invention can be used in any system where the user touches or at least closely approaches the IdSystem. Examples are touch screen, mouse, keyboard, doors, or other peripherals or devices used in a security-sensitive context requiring identification. It is especially useful in environments where many users are sharing a device or system. In particular, clinicians using imaging systems need to log-in and log-out very often and the proposed BCC-based identification system offers them speed and reliability for doing that. Access rights can be checked on very fine granularity, so that comfortable sharing of devices can be achieved even when gloves are used.

Moreover, automatic identification is increasingly required in other medical applications, both to improve patient safety, and workflow efficiency. Patient identifiers based on body-coupled communication allow for automatic recognition of patients during medical examinations, safe & automatic association of devices, sensors and wireless measurements to individual patients. However, the proposed system can also be used in other environments using secure authentication, such as professional IT identification, bank systems or automotive areas. Examples in the automotive area are car entry where a car can be opened by just touching it, theft protection, which allows only operating the car for specified users wearing an identification tag, or car configuration/personalization, which takes away the burden from the user to adjust the car settings to his/her personal preferences, the user is immediately recognized when entering the car.

In summary, a secure identification system has been described in which a user gets access through an identification device or badge or tag worn on his/her body, which applies BCC techniques to create a kind of aura around the user. An ID is communicated to a user interface of the secure identification system through BCC communication, and the user is authenticated by the system through an authentication procedure checking the identity of the user on the basis of an assumed secure BCC communication of the ID.

While the invention has been illustrated and described in detail in the drawings and the foregoing description, such illustration and description are to be considered illustrative or exemplary and not restrictive. The invention is not limited to the disclosed embodiments. From reading the present disclosure, other modifications will be apparent to persons skilled in the art. Such modifications may involve other features which are already known in the art and which may be used instead of or in addition to features already described herein.

Variations to the disclosed embodiments can be understood and effected by those skilled in the art, from a study of the drawings, the disclosure and the appended claims. In the claims, the word "comprising" does not exclude other elements or steps, and the indefinite article "a" or "an" does not exclude a plurality of elements or steps. A single processor or other unit may fulfill at least the functions of the data and synchronization correlators, e.g. as described in connection with FIGS. 8 and 9, based on corresponding software routines. The computer program may be stored/distributed on a suitable medium, such as an optical storage medium or a solid-state medium supplied together with or as part of other hardware, but may also be distributed in other forms, such as via the Internet or other wired or wireless telecommunication systems. The mere fact that certain measures are recited in mutually different dependent claims does not indicate that a combination of these measures cannot be used to advantage. Any reference signs in the claims should not be construed as limiting the scope thereof.

The invention claimed is:

1. A portable apparatus for identifying a user, said apparatus comprising:
 a detector for detecting a signal which indicates a request for identification;
 a transmitter for activating a body coupled communication to transfer a user identification over the body of said user in response to said detection; and
 an authenticator for authenticating said user, said authenticator being configured to create a list of available body communication transceivers based on received responses to an initial discovery message, said authenticator being further configured to control said transmitter to transmit a presence detection message over the body of said user at predetermined intervals, and to deactivate said portable apparatus if no responses to the presence detection message are received from a predetermined number of the body communication transceivers for a predetermined number of times.

2. The portable apparatus according to claim 1, wherein said apparatus is a mobile terminal device or another device wearable by said user, or is integrated into a cloth wearable by said user.

3. The portable apparatus according to claim 1, wherein said signal is a received body coupled communication signal.

4. The portable apparatus according to claim 1, wherein said authenticator is adapted for performing at least one of the following:
 authenticating said user based on an input signal received from an input device, to activate said portable apparatus in response to the result of the authentication;
 deactivating said portable apparatus in response to a measured power or interference level of at least one body coupled communication channel; and
 deactivating said portable apparatus in response to a detected temperature change.

5. An apparatus for identifying a user, said apparatus comprising:
 a touch sensor for detecting a user action at said apparatus;
 a receiver for receiving a user identification transmitted by a portable user identification device via body coupled communication over the body of said user;
 an access controller for comparing said user-specific information with a stored information and for granting access to said apparatus in response to the comparison result; and
 an authentication device for inputting a user authentication information, said authentication device being configured to activate or deactivate the portable user identification device based a comparison of the user-authentication information with a stored authentication information.

6. The apparatus according to claim 5, further comprising a touch screen comprising said sensor.

7. The apparatus according to claim 6, wherein said user action comprises a touching operation.

8. The apparatus according to claim 7, wherein detection electrodes of said receiver are integrated in said touch screen.

9. The apparatus according to claim 5, further comprising a security database for storing said stored information.

10. The apparatus according to claim 5, wherein said access controller is adapted to perform at least one of the following actions:
 automatically logging-on said user if said user is authorized to use said apparatus,
 automatically logging-off said user after a timer has counted a predetermined time-out since the last user action,
 storing an information indicating an identification and an access time of each user having accessed said apparatus.

11. The apparatus according to claim 5, wherein said access controller is adapted to check said input user-specific information and to control a transmitter for body coupled communication to transmit a confirmation message if said input user-specific information is correct.

12. A method of identifying a user, said method comprising:
 detecting a touch of an identification system by a user;
 transferring a user identification to said identification system via body coupled communication over the body of said user in response to said detection;
 creating a list of available body communication transceivers based on received responses to an initial discovery message;
 transmitting a presence detection message over the body of said user at predetermined intervals, and
 deactivating a portable user identification apparatus if no responses to the presence detection message are received from a predetermined number of the body communication transceivers for a predetermined number of times.

13. The method according to claim 12, further comprising:
determining a power or interference level of at least one body coupled communication channel; and
deciding whether said user is proximate to the body coupled transceiver device based on the result of the determination.

14. A non-transitory computer-readable medium comprising instructions for executing a method on a computing device, the method comprising:
detecting a touch of an identification system by a user;
transferring a user identification to said identification system via body coupled communication over the body of said user in response to said detection;
creating a list of available body communication transceivers based on received responses to an initial discovery message;
transmitting a presence detection message over the body of said user at predetermined intervals, and
deactivating a portable apparatus if no responses to the presence detection message are received from a predetermined number of the body communication transceivers for a predetermined number of times.

* * * * *